(12) United States Patent
Zhou et al.

(10) Patent No.: US 12,445,961 B2
(45) Date of Patent: Oct. 14, 2025

(54) BEAM FAILURE DETECTION REFERENCE SIGNAL MONITORING FOR DISCONTINUOUS RECEPTION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 718 days.

(21) Appl. No.: 17/657,253

(22) Filed: Mar. 30, 2022

(65) Prior Publication Data

US 2023/0319713 A1  Oct. 5, 2023

(51) Int. Cl.
*H04W 52/02* (2009.01)
*H04W 24/04* (2009.01)
*H04W 76/19* (2018.01)
*H04W 76/28* (2018.01)

(52) U.S. Cl.
CPC ....... *H04W 52/0225* (2013.01); *H04W 24/04* (2013.01); *H04W 76/19* (2018.02); *H04W 76/28* (2018.02)

(58) Field of Classification Search
CPC . H04W 52/0225; H04W 24/04; H04W 76/19; H04W 76/28
See application file for complete search history.

(56) References Cited

U.S. PATENT DOCUMENTS

| | | | |
|---|---|---|---|
| 2019/0394082 A1* | 12/2019 | Cirik | H04W 76/28 |
| 2019/0394660 A1* | 12/2019 | He | H04B 7/088 |
| 2020/0205219 A1* | 6/2020 | Chen | H04W 76/19 |
| 2022/0377756 A1* | 11/2022 | Sun | H04B 7/0695 |

* cited by examiner

*Primary Examiner* — Dinh Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, configuration information that indicates a configuration for monitoring beam failure detection reference signals (BFD-RSs) in a discontinuous reception (DRX) on duration. The UE may transmit, to the network node, information that is based at least in part on the BFD-RSs being monitored in the DRX on duration in accordance with the configuration. Numerous other aspects are described.

30 Claims, 12 Drawing Sheets

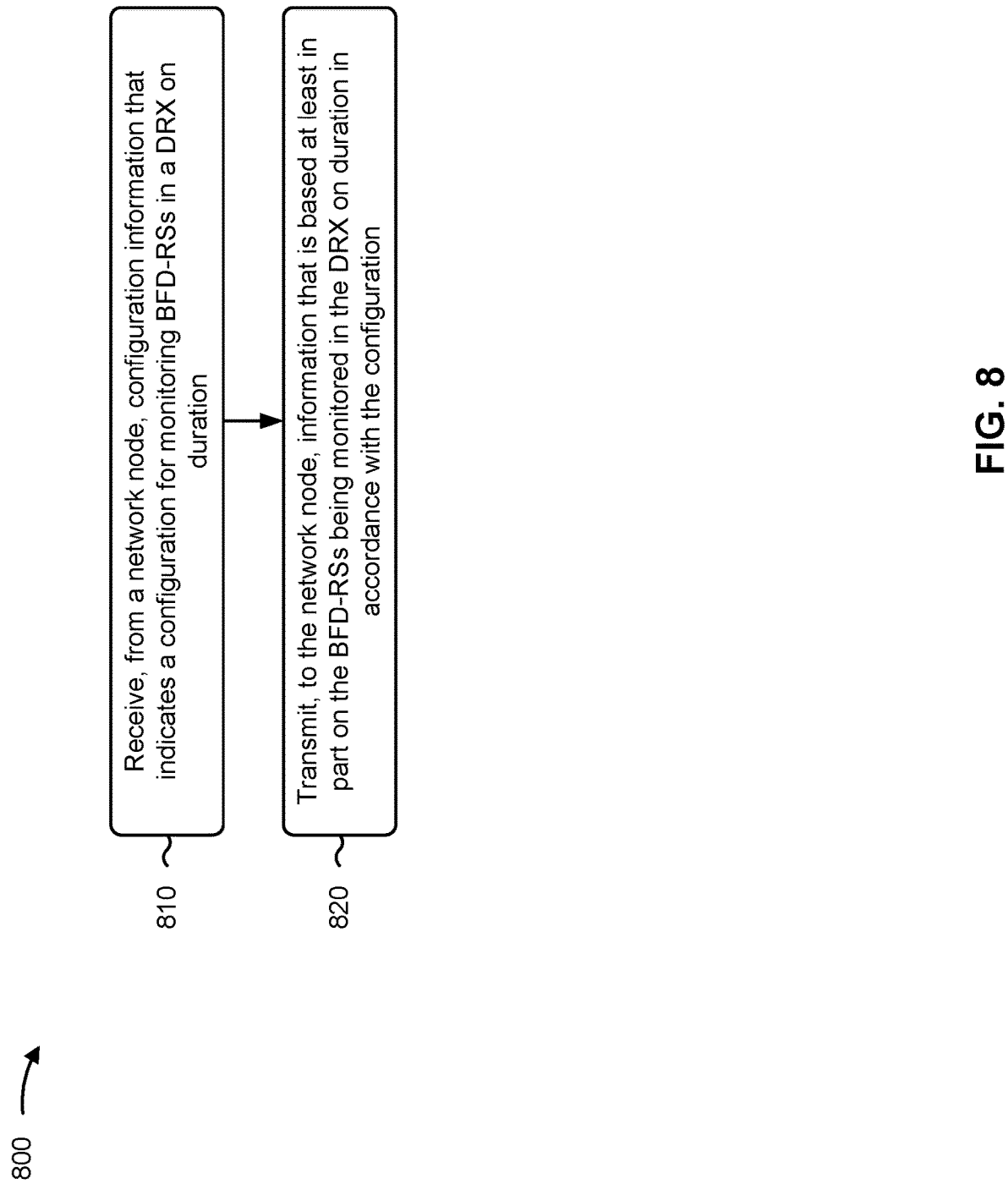

BEAM FAILURE DETECTION REFERENCE SIGNAL MONITORING FOR DISCONTINUOUS RECEPTION

FIELD OF THE DISCLOSURE

Aspects of the present disclosure generally relate to wireless communication and to techniques and apparatuses for beam failure detection reference signal monitoring for discontinuous reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving, from a network node, configuration information that indicates a configuration for monitoring beam failure detection reference signals (BFD-RSs) in a discontinuous reception (DRX) on duration. The method may include transmitting, to the network node, information that is based at least in part on the BFD-RSs being monitored in the DRX on duration in accordance with the configuration.

Some aspects described herein relate to a method of wireless communication performed by an apparatus of a network node. The method may include transmitting configuration information for a UE that indicates a configuration for monitoring BFD-RSs in a DRX on duration. The method may include receiving information that is based at least in part on the BFD-RSs being monitored in the DRX on duration in accordance with the configuration.

Some aspects described herein relate to a UE for wireless communication. The UE may include a memory and one or more processors coupled with the memory. The one or more processors may be configured to cause the UE to receive, from a network node, configuration information that indicates a configuration for monitoring BFD-RSs in a DRX on duration. The one or more processors may be configured to cause the UE to transmit, to the network node, information that is based at least in part on the BFD-RSs being monitored in the DRX on duration in accordance with the configuration.

Some aspects described herein relate to a network node for wireless communication. The network node may include a memory and one or more processors coupled with the memory. The one or more processors may be configured to cause the network node to transmit configuration information for a UE that indicates a configuration for monitoring BFD-RSs in a DRX on duration. The one or more processors may be configured to cause the network node to receive information that is based at least in part on the BFD-RSs being monitored in the DRX on duration in accordance with the configuration.

Some aspects described herein relate to a non-transitory computer-readable medium that stores a set of instructions for wireless communication by a UE. The set of instructions, when executed by one or more processors of the UE, may cause the UE to receive, from a network node, configuration information that indicates a configuration for monitoring BFD-RSs in a DRX on duration. The set of instructions, when executed by one or more processors of the UE, may cause the UE to transmit, to the network node, information that is based at least in part on the BFD-RSs being monitored in the DRX on duration in accordance with the configuration.

Some aspects described herein relate to a non-transitory computer-readable medium that stores a set of instructions for wireless communication by a network node. The set of instructions, when executed by one or more processors of the network node, may cause the network node to transmit configuration information for a UE that indicates a configuration for monitoring BFD-RSs in a DRX on duration. The set of instructions, when executed by one or more processors of the network node, may cause the network node to receive information that is based at least in part on the BFD-RSs being monitored in the DRX on duration in accordance with the configuration.

Some aspects described herein relate to an apparatus for wireless communication. The apparatus may include means for receiving, from a network node, configuration information that indicates a configuration for monitoring BFD-RSs in a DRX on duration. The apparatus may include means for transmitting, to the network node, information that is based at least in part on the BFD-RSs being monitored in the DRX on duration in accordance with the configuration.

Some aspects described herein relate to an apparatus for wireless communication. The apparatus may include means for transmitting configuration information for a UE that indicates a configuration for monitoring BFD-RSs in a DRX on duration. The apparatus may include means for receiving information that is based at least in part on the BFD-RSs being monitored in the DRX on duration in accordance with the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-9 are diagrams illustrating example processes associated with BFD-RS monitoring for DRX, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
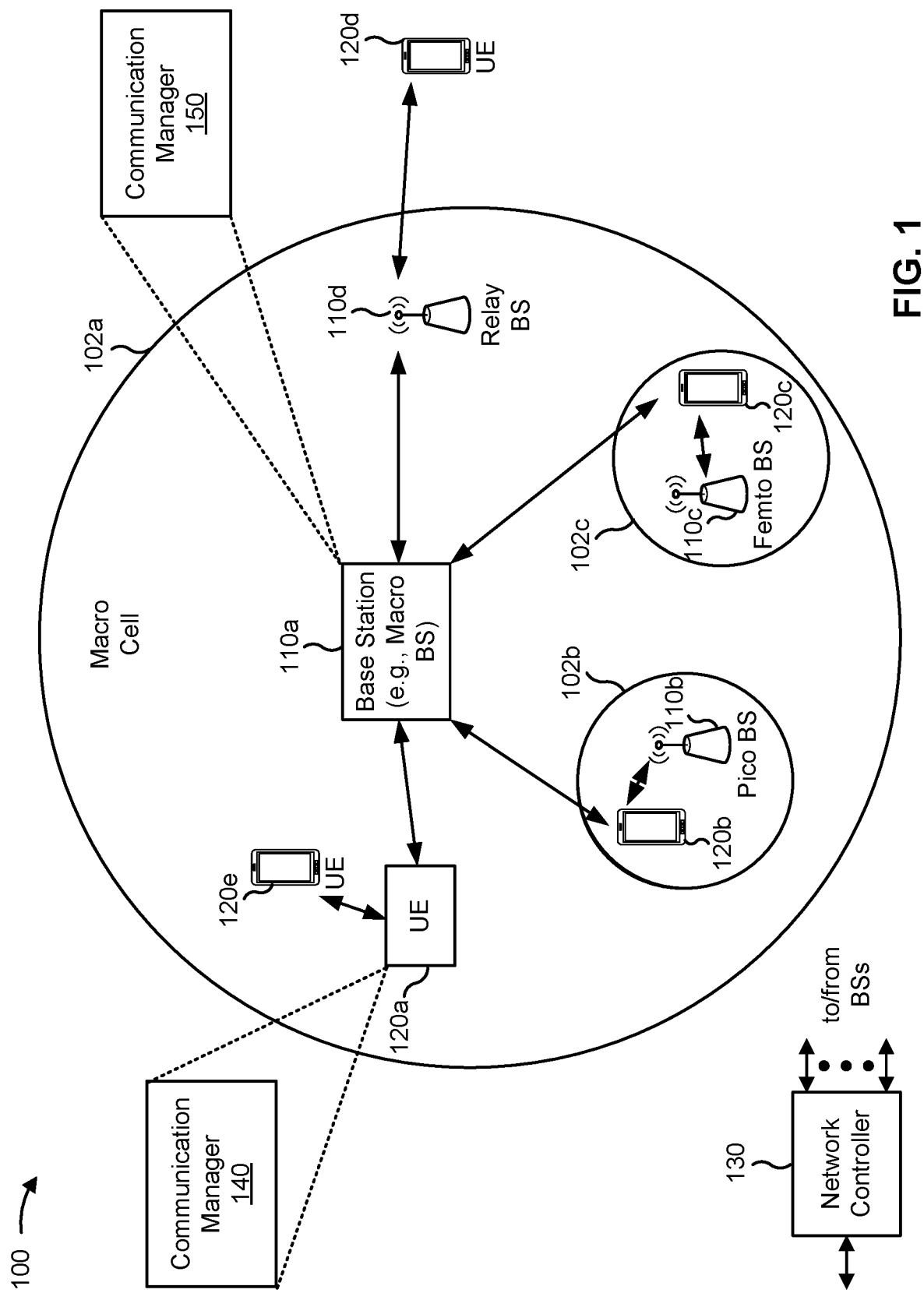
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, configuration information that indicates a configuration for monitoring beam failure detection reference signals (BFD-RSs) in a discontinuous reception (DRX) on duration; and transmit, to the network node, information that is based at least in part on the BFD-RSs being monitored in the DRX on duration in accordance with the configuration. Additionally, or alternatively, the communication manager 140 may perform one or more other operations described herein.

In some aspects, a network node (e.g., a base station 110) may include a communication manager 150. As described in more detail elsewhere herein, the communication manager 150 may transmit configuration information for a UE that indicates a configuration for monitoring BFD-RSs in a DRX on duration; and receive information that is based at least in part on the BFD-RSs being monitored in the DRX on duration in accordance with the configuration. Additionally, or alternatively, the communication manager 150 may perform one or more other operations described herein.

As indicated above, FIG. 1 is provided as an example. Other examples may differ from what is described with regard to FIG. 1.

Figure 2:
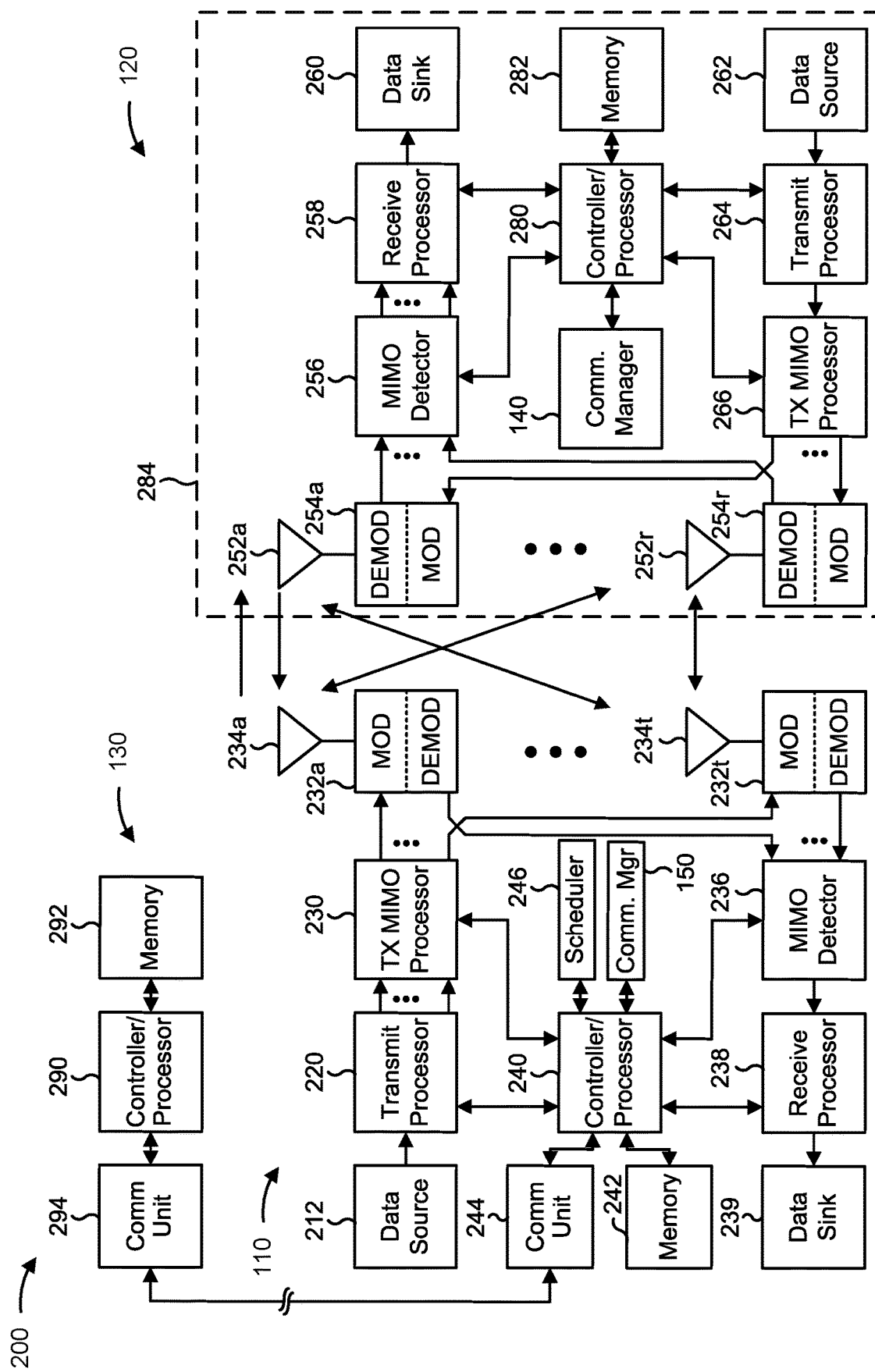
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-7B and 8-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-7B and 8-11).

The controller/processor 240 of the base station 110, the controller/processor 280 of the UE 120, and/or any other component(s) of FIG. 2 may perform one or more techniques associated with BFD-RS monitoring for DRX, as described in more detail elsewhere herein. In some aspects, a network node described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a network node, configuration information that indicates a configuration for monitoring BFD-RSs in a DRX on duration; and/or means for transmitting, to the network node, information that is based at least in part on the BFD-RSs being monitored in the DRX on duration in accordance with the configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a base station 110) includes means for transmitting configuration information for a UE that indicates a configuration for monitoring BFD-RSs in a DRX on duration; and/or means for receiving information that is based at least in part on the BFD-RSs being monitored in the DRX on duration in accordance with the configuration. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR BS, 5G NB, access point (AP), a TRP, or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
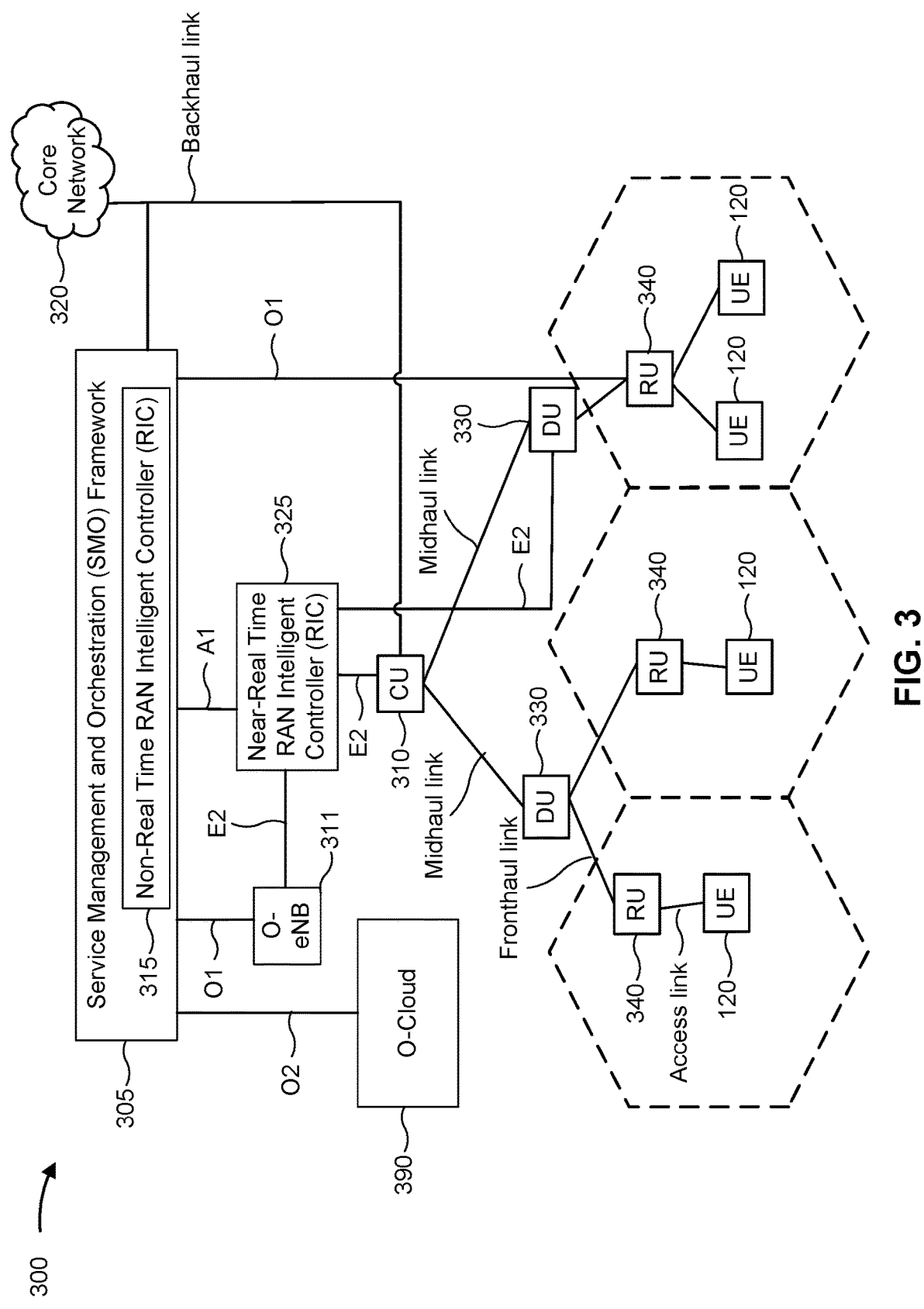
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
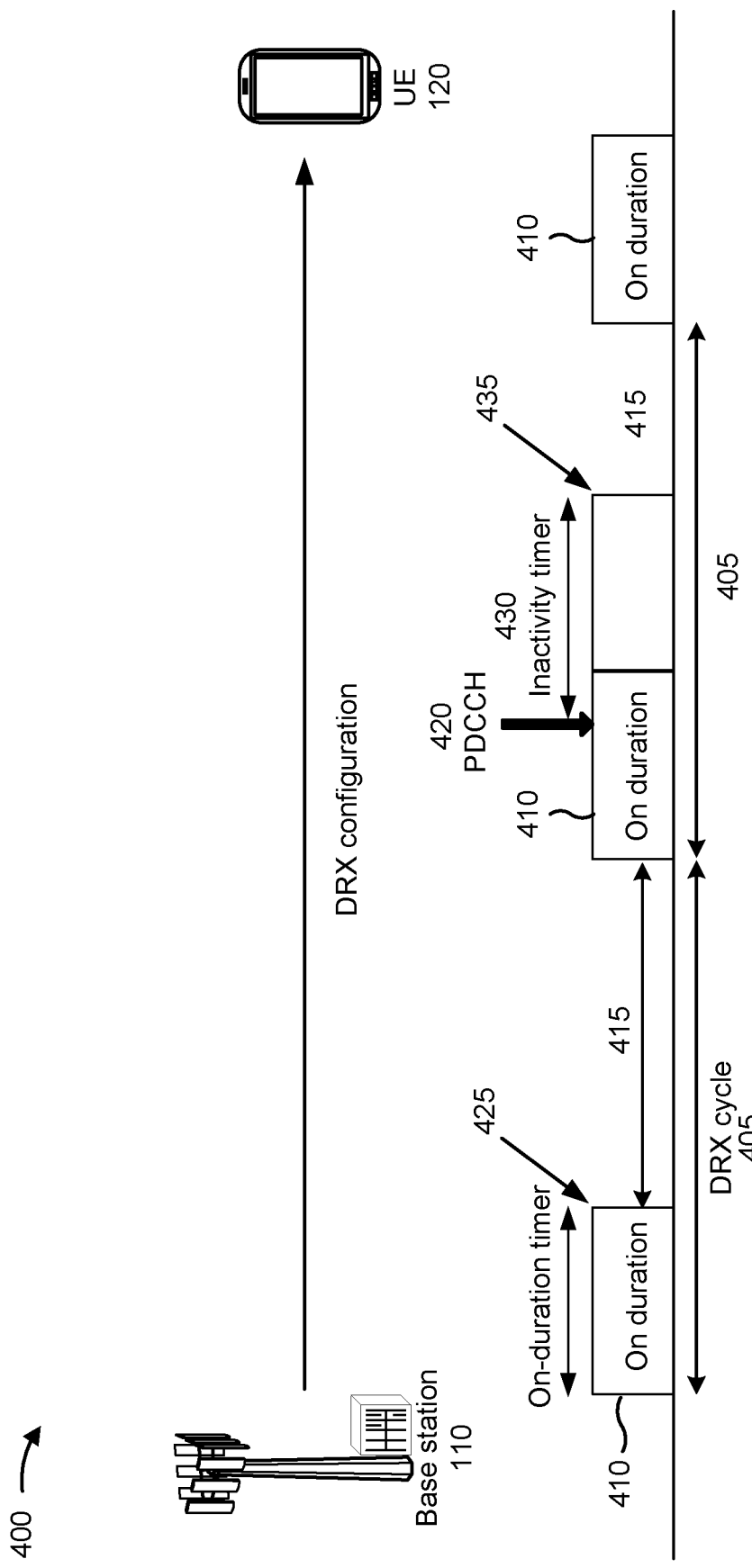
FIG. 4 is a diagram illustrating an example of a discontinuous reception (DRX) configuration, in accordance with the present disclosure.

FIG. 4 is a diagram illustrating an example 400 of a DRX configuration, in accordance with the present disclosure.

As shown in FIG. 4, a base station may transmit a DRX configuration to a UE to configure a DRX cycle 405 for the UE. A DRX cycle 405 may include a DRX on duration 410 (e.g., during which a UE is awake or in an active state) and an opportunity to enter a DRX sleep state 415. As used herein, the time during which the UE is configured to be in an active state during the DRX on duration may be referred to as an active time, and the time during which the UE is configured to be in the DRX sleep state 415 may be referred to as an inactive time. As described below, the UE may monitor a physical downlink control channel (PDCCH) during the active time, and may refrain from monitoring the PDCCH during the inactive time.

During the DRX on duration 410 (e.g., the active time), the UE may monitor a downlink control channel (e.g., a PDCCH), as shown by reference number 420. For example, the UE may monitor the PDCCH for downlink control information (DCI) pertaining to the UE. If the UE does not detect and/or successfully decode any PDCCH communications intended for the UE during the DRX on duration 410, then the UE may enter the sleep state 415 (e.g., for the inactive time) at the end of the DRX on duration 410, as shown by reference number 425. In this way, the UE may conserve battery power and reduce power consumption. As shown, the DRX cycle 405 may repeat with a configured periodicity according to the DRX configuration.

If the UE detects and/or successfully decodes a PDCCH communication intended for the UE, then the UE may remain in an active state (e.g., awake) for the duration of a DRX inactivity timer 430 (e.g., which may extend the active time). The UE may start the DRX inactivity timer 430 at a time at which the PDCCH communication is received (e.g., in a transmission time interval (TTI) in which the PDCCH communication is received, such as a slot or a subframe). The UE may remain in the active state until the DRX inactivity timer 430 expires, at which time the UE may enter the sleep state 415 (e.g., for the inactive time), as shown by reference number 435. During the duration of the DRX inactivity timer 430, the UE may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE may restart the DRX inactivity timer 430 after each detection of a PDCCH communication for the UE for an initial transmission (e.g., but not for a retransmission). By operating in this manner, the UE may conserve battery power and reduce power consumption by entering the sleep state 415.

As indicated above, FIG. 4 is provided as an example. Other examples may differ from what is described with respect to FIG. 4.

Figure 5:
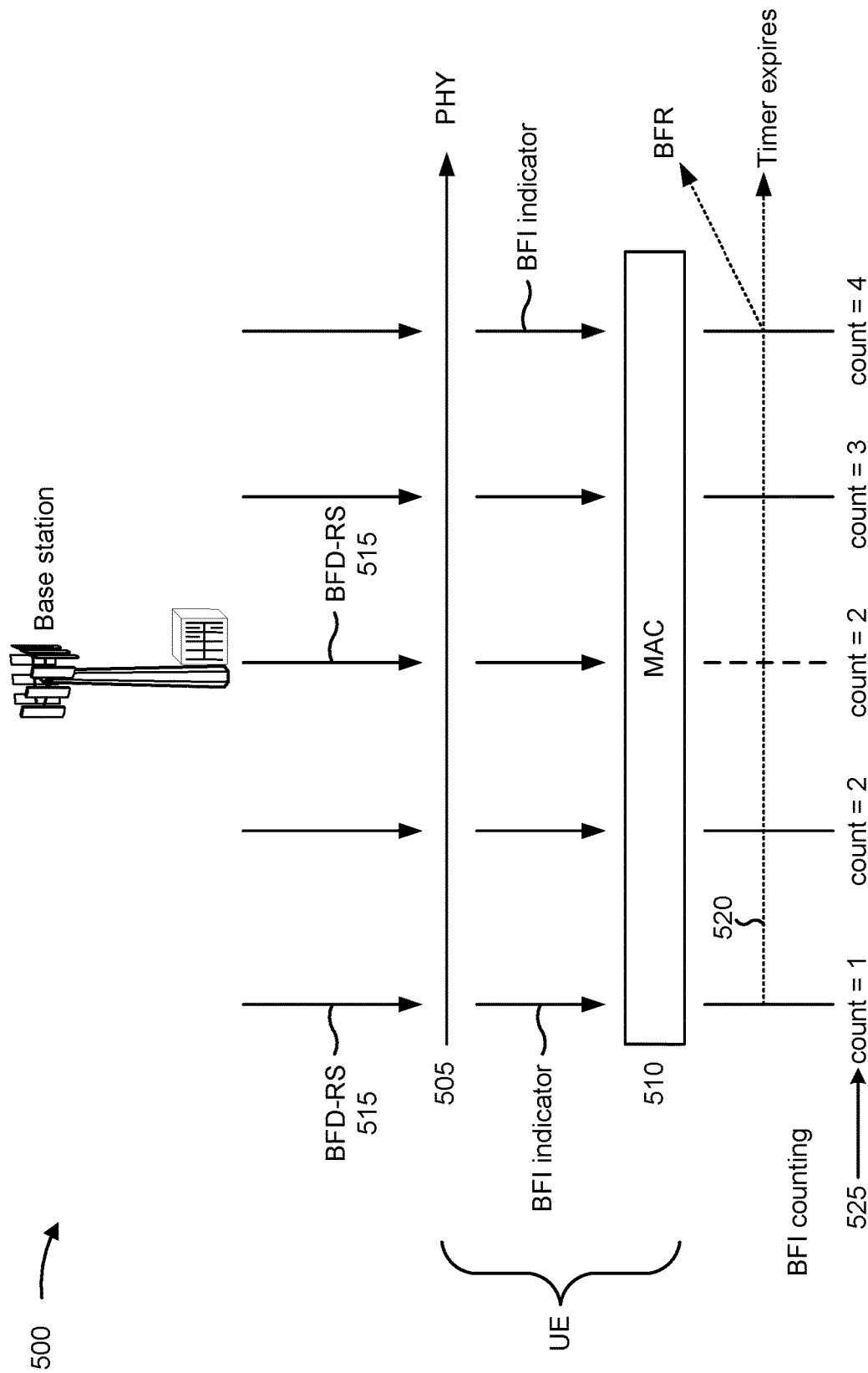
FIG. 5 is a diagram illustrating an example of beam failure detection (BFD) and beam failure recovery (BFR), in accordance with the present disclosure.

FIG. 5 is a diagram illustrating an example 500 of beam failure detection and beam failure recovery, in accordance with the present disclosure. Example 500 includes operations that may be performed by a base station and a UE. Actions of the UE that are performed by a PHY layer of the UE are shown in the row indicated by reference number 505, and actions of the UE that are performed by a MAC layer of the UE are shown in the row indicated by reference number 510.

As shown, the base station may transmit, and the UE may monitor (e.g., constantly), BFD-RSs 515 using a set of beams (e.g., channel state information reference signals (CSI-RSs), synchronization signal blocks (SSBs), or the like). The UE may monitor the BFD-RSs 515 at the PHY layer of the UE. At every occasion of a BFD-RS 515, the UE may determine a beam failure instance (BFI) indicator (e.g., indicating whether a BFI was determined by the UE in connection with the BFD-RS 515), and the UE may indicate the BFI indicator to the MAC layer of the UE. For example, the UE may determine a measurement for a BFD-RS 515, and the UE may determine a BFI for the BFD-RS 515 if the measurement satisfies a measurement threshold (e.g., if an estimated block error rate (BLER) satisfies a threshold).

The UE may initiate a BFD timer 520 based at least in part on a first BFI that is indicated. The UE (e.g., at the MAC layer) may increment a BFI count 525 each time BFI is indicated. If the BFI count 525 satisfies a count threshold (e.g., a maximum count (or maxCount) value for declaring beam failure), such as 4, before expiration of the BFD timer 520, then the UE may determine (e.g., declare) beam failure and initiate a beam failure recovery (BFR) procedure (e.g., which may include a random access procedure). Otherwise, if the BFI count 525 does not satisfy the threshold by expiration of the BFD timer 520, then the UE may not determine beam failure, and the UE may reset the BFI count 525 to zero and reset the BFD timer 520.

As indicated above, FIG. 5 is provided as an example. Other examples may differ from what is described with regard to FIG. 5.

Figure 6:
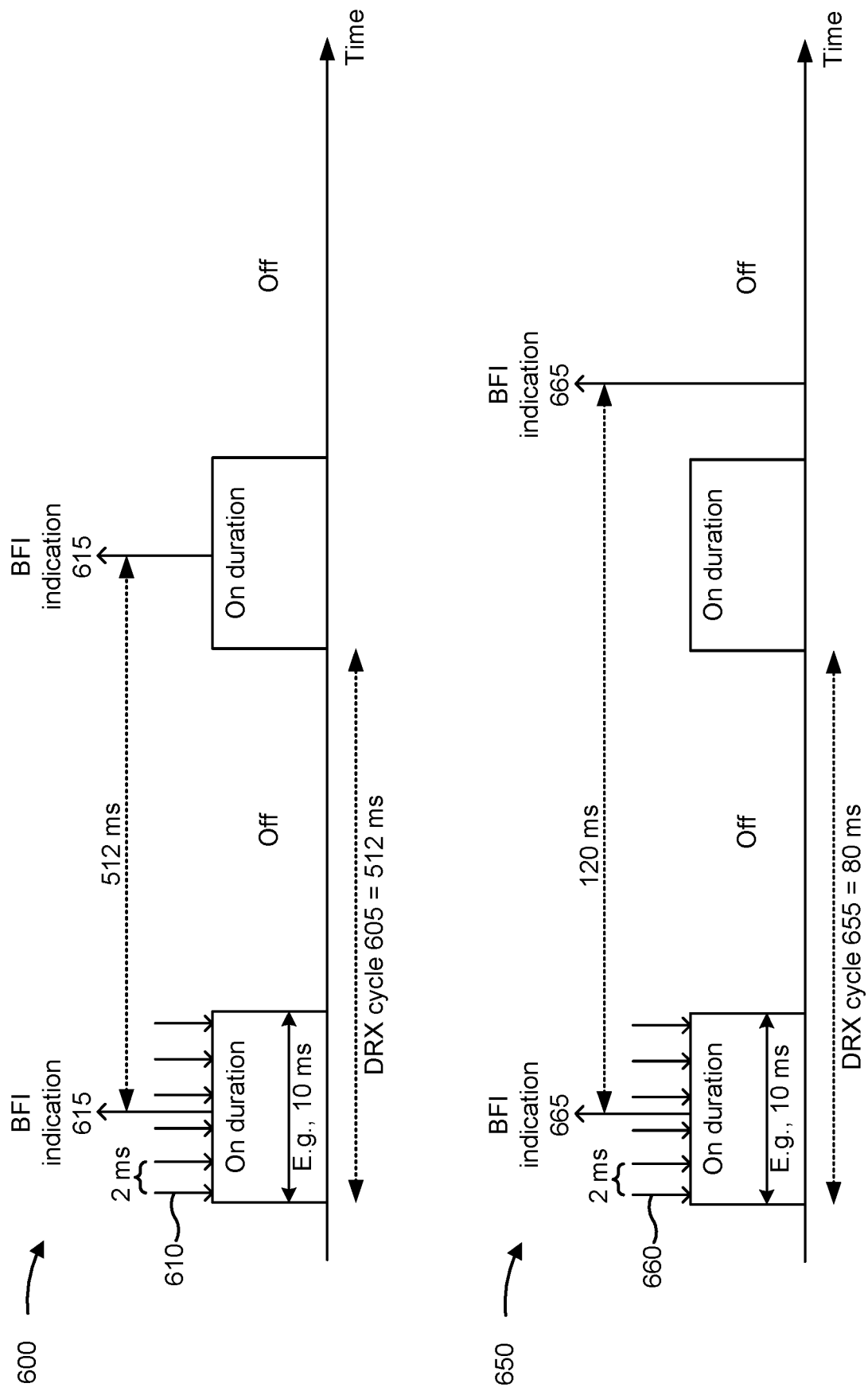
FIG. 6 is a diagram illustrating examples of BFD and BFR for DRX, in accordance with the present disclosure.

FIG. 6 is a diagram illustrating examples 600 and 650 of beam failure detection and beam failure recovery for DRX, in accordance with the present disclosure.

When a UE is operating in a DRX mode, the UE may perform procedures relating to beam management, such as BFD and BFR, in a sparse manner. For example, although the base station may transmit BFD-RSs frequently (e.g., every 2 milliseconds (ms)), the UE, in the DRX mode, provides BFI indications from a PHY layer to a MAC layer that are separated in time by a particular time interval (e.g., T_indication_interval_BFD).

When the length of a DRX cycle is greater than 320 ms, the time interval may be greater than or equal to the length of the DRX cycle. In example 600, the length of a DRX cycle 605 is 512 ms. Thus, although BFD-RSs 610 are transmitted every 2 ms in example 600, the UE may report at most one BFI indication 615 per DRX cycle 605. When the length of a DRX cycle is less than or equal to 320 ms, the time interval may be greater than or equal to 1.5 times the length of the DRX cycle. In example 650, the length of a DRX cycle 655 is 80 ms. Thus, although BFD-RSs 660 are transmitted every 2 ms in example 650, the UE may report at most one BFI indication 665 per 1.5 DRX cycles 655.

As a result, when the UE is in the DRX mode, beam management procedures for the UE may be slow, thereby degrading the performance of communications of the UE. Moreover, beam management procedures for DRX may not be suitable for traffic with low latency or high reliability requirements, such as extended reality (XR) traffic. XR traffic may be associated with strict deadlines for transmissions, and thus beam quality should be maintained constantly to ensure timely communication between the UE and the base station.

Some techniques and apparatuses described herein provide improved beam management for a UE operating in a DRX mode. In some aspects, the UE may receive a configuration for monitoring BFD-RSs in a DRX on duration. For example, the configuration may result in more than one BFD-RS being monitored by the UE in one DRX on duration (e.g., more frequent monitoring of BFD-RSs than would otherwise occur if BFD-RS monitoring is separated by the time interval described herein). Moreover, the configuration may enable the UE to report a BFI indication for each BFD-RS monitored by the UE in the one DRX on duration (e.g., the UE may report more than one BFI indication in the one DRX on duration). In this way, beam management procedures may be performed with improved speed, thereby maintaining a beam quality for the UE and improving the performance of communications of the UE. In some aspects, during a DRX on duration, the UE may transmit a request to extend the DRX on duration and/or a report of a BFD status of the UE. In this way, a network node may prepare the UE for potential beam switching by signaling to the UE to extend the DRX on duration (e.g., to facilitate additional beam measurement by the UE) and/or by signaling to the UE information relating to new candidate beams for the UE to measure. In this way, the UE may be prepared to quickly switch to a new beam if a current beam of the UE is inadequate.

As indicated above, FIG. 6 is provided as an example. Other examples may differ from what is described with regard to FIG. 6.

Figure 7A:
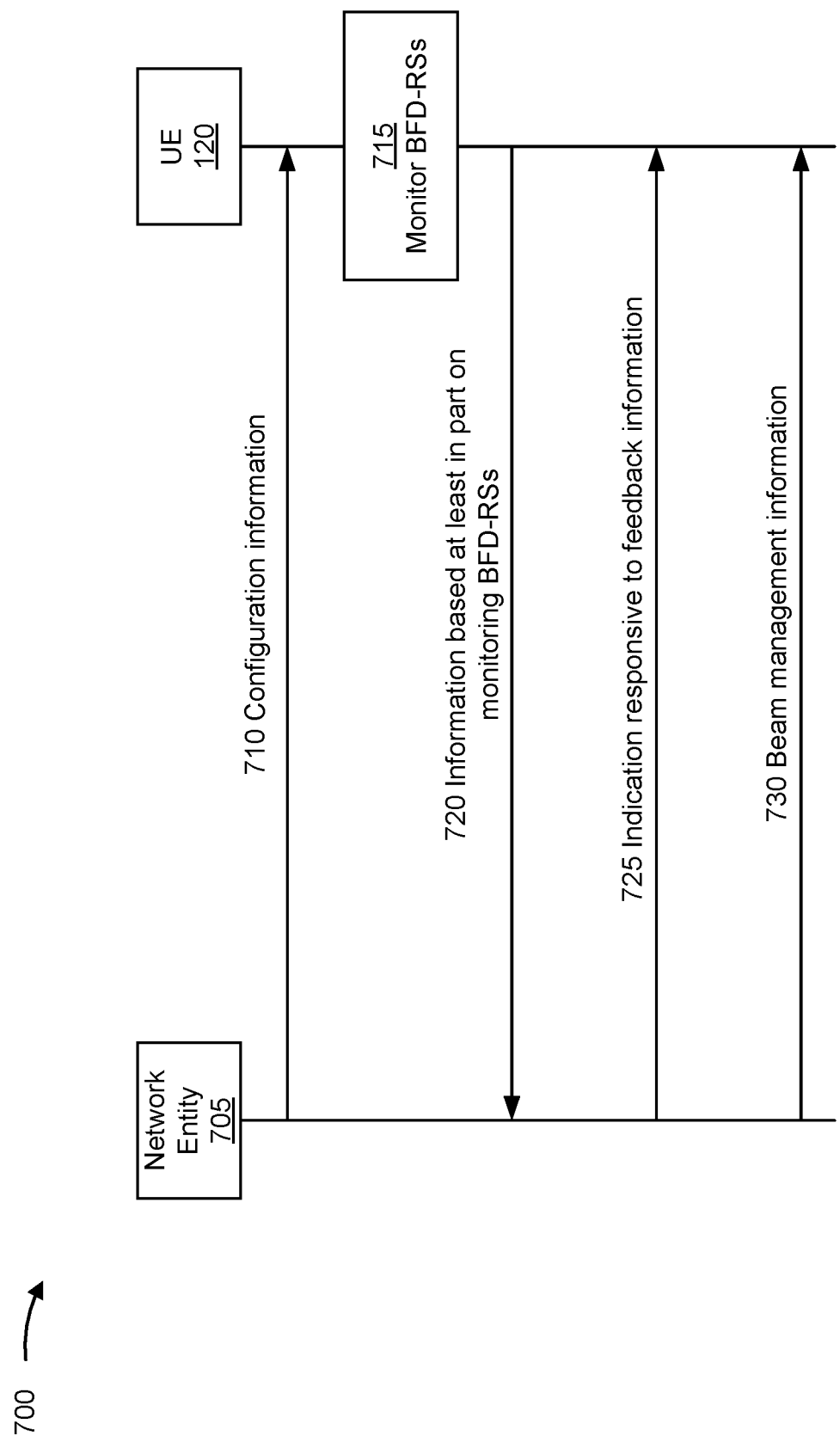
FIGS. 7A-7B are diagrams illustrating examples associated with BFD reference signal (BFD-RS) monitoring for DRX, in accordance with the present disclosure.

FIG. 7A is a diagram illustrating an example 700 associated with BFD-RS monitoring for DRX, in accordance with the present disclosure. As shown in FIG. 7A, example 700 includes communication between a network node 705 and a UE 120. In some aspects, the network node 705 and the UE 120 may be included in a wireless network, such as wireless network 100. The network node 705 may be, or may include, a base station 110 or one or more components of a disaggregated base station, such as a CU 310, a DU 330, an RU 340, or the like.

As shown by reference number 710, the network node 705 may transmit, and the UE 120 may receive, configuration information. The configuration information may be indicated in an RRC message (e.g., the UE 120 may receive the configuration information via RRC signaling). In some aspects, the configuration information may include a DRX configuration, in a similar manner as described in connection with FIG. 4. For example, the DRX configuration may indicate a DRX on duration for the UE 120, in which the UE 120 is to be in an active state. The UE 120 may operate in a DRX mode based at least in part on the DRX configuration.

In some aspects, the configuration information may indicate a configuration for monitoring BFD-RSs in a DRX on duration. The configuration may indicate that the UE 120 is to monitor all, or a portion of, BFD-RSs in a DRX on duration. In some aspects, the configuration is configured to result in more than one BFD-RS being monitored by the UE 120 in one DRX on duration. In some aspects, the configuration is configured to enable the UE 120 to indicate a BFI (e.g., if a BFI condition is met) for each BFD-RS being monitored by the UE 120 in the one DRX on duration. In some aspects, the configuration may indicate a quantity of BFD-RSs that are to be monitored in a DRX on duration, a pattern for monitoring BFD-RSs in a DRX on duration (e.g., monitor every other BFD-RS, monitor every third BFD-RS, or the like), a time for monitoring BFD-RSs in a DRX on duration, or the like. In particular, the configuration may indicate a time duration in the DRX on duration in which the UE 120 is to monitor BFD-RSs. In some aspects, the configuration may indicate multiple such time durations. Here, the network node 705 may transmit, and the UE 120 may receive, an indication that the UE 120 is to use a particular time duration of the multiple time durations configured for the UE 120. The indication may be in a MAC control element (MAC-CE) or in DCI.

As shown by reference number 715, the UE 120 may monitor BFD-RSs in a DRX on duration in accordance with the configuration for monitoring BFD-RSs. To monitor the BFD-RSs, the UE 120 may determine measurements for the BFD-RSs. Moreover, to monitor the BFD-RSs, the UE 120 may determine a BFI indication for a BFD-RS, and indicate (e.g., record) the BFI indication to an upper layer of the UE 120, such as the MAC layer. For example, the UE 120 may indicate a BFI based at least in part on a determination that a BFI condition, associated with a BFD-RS, is satisfied (e.g., an estimated BLER satisfies a threshold). In this way, while the UE 120 is operating in a DRX mode, beam management procedures may be performed with improved speed, thereby maintaining a beam quality for the UE 120 and improving the performance of communications of the UE.

As shown by reference number 720, the UE 120 may transmit, and the network node 705 may receive, information that is based at least in part on monitoring the BFD-RSs in accordance with the configuration. In some aspects, the information may include beam measurement information, beam selection information, or the like.

In some aspects, the information may include feedback information. For example, the feedback information may indicate a request to extend a current DRX on duration. Additionally, or alternatively, the feedback information may indicate a report of a current BFD status of the UE 120. For example, the report of the current BFD status may indicate a total BFI count, a BFI recording history, a quantity of consecutive BFIs, or the like.

In some aspects, the configuration may indicate a configuration that indicates that the UE 120 is to transmit the feedback information at an end of a DRX on duration (e.g., prior to an end of a DRX on duration). That is, the configuration may indicate that the UE is to transmit the feedback information (rather than refraining from transmitting the feedback information), which is to occur at an end of a DRX on duration. In some aspects, the UE 120 may transmit the feedback information at an end of a DRX on duration (e.g., in accordance with the configuration). The UE 120 may transmit the feedback information in a MAC-CE or in uplink control information.

In some aspects, the configuration information may indicate a configuration that indicates that the feedback information is to be transmitted by the UE 120 responsive to one or more conditions. That is, the one or more conditions are to cause (e.g., trigger) the UE 120 to transmit the feedback information. A condition may include a total BFI count satisfying (e.g., equaling) a total count threshold that is based at least in part on a maximum BFI count (e.g., maxCount) for initiating BFR. For example, the total count threshold may be a proportion (e.g., a percentage) of the maximum BFI count. Additionally, or alternatively, a condition may include a quantity of consecutive BFIs satisfying (e.g., exceeding) a consecutive count threshold. "Consecutive BFIs" may refer to BFIs being indicated for consecutively monitored BFD-RSs. In some aspects, the UE 120 may transmit the feedback information based at least in part on a determination that a condition for transmitting the feedback information (e.g., in accordance with the configuration) is satisfied. For example, the UE 120 may transmit the feedback information based at least in part on a determination that a BFI count satisfies the total count threshold and/or a determination that a quantity of consecutive BFIs satisfies the consecutive count threshold.

As shown by reference number 725, the network node 705 may transmit, and the UE 120 may receive, an indication responsive to the feedback information. For example, the indication may be based at least in part on whether the UE 120 requested to extend a DRX on duration and/or based at least in part on the report of the BFD status of the UE 120 (e.g., which may indicate whether beam failure has occurred or is likely to occur). The indication may be to prepare the UE 120 for potential beam switching. In some aspects, the indication may indicate an extension of a current DRX on duration (e.g., an extension of the DRX on duration in which the feedback information was transmitted). For example, the indication may indicate an extension value for extending the DRX on duration, such as a time period (e.g., in milliseconds), a quantity of symbols, or the like. Moreover, the indication may indicate a time-wise validity for the extension of the DRX on duration, such as whether the extension is applicable to only a current DRX cycle, or a quantity of subsequent DRX cycles to which the extension applies.

Additionally, or alternatively, the indication may indicate a resource set corresponding to one or more new candidate beams to be measured by the UE 120. In this way, the UE 120 may prepare for potential beam switching to the one or more new candidate beams, thereby facilitating fast beam switching. In some aspects, the indication is transmitted in a MAC-CE or in DCI.

As shown by reference number 730, the network node 705 may transmit, and the UE 120 may receive, beam management information responsive to the feedback information. For example, the beam management information may be based at least in part on the report of the BFD status of the UE 120 (e.g., which may indicate whether beam failure has occurred or is likely to occur). The beam management information may include content to prepare the UE 120 for measuring the one or more new candidate beams. In some aspects, the beam management information may indicate beam information (e.g., beam indices, spatial relations, or the like) relating to the one or more new candidate beams. In some aspects, the beam management information may, additionally or alternatively, indicate BFD-RS monitoring resources for the one or more new candidate beams. In some aspects, the beam management information may, additionally or alternatively, indicate a BFD-RS transmission frequency (e.g., indicate how frequently BFD-RSs are transmitted) for the one or more new candidate beams. The transmission frequency may be different from a transmission frequency of BFD-RSs that correspond to beams of the UE 120 that were being measured before the one or more new candidate beams. In some aspects, the beam management information may, additionally or alternatively, indicate BFD parameters for the one or more new candidate beams. The BFD parameters may include a BLER threshold for determining BFI, a BFD timer length, a maximum BFI count (e.g., maxCount) for initiating BFR, or the like.

The UE 120 may determine beam measurements in accordance with the indication and/or the beam management information. For example, the UE 120 may monitor and measure BFD-RSs in an extended DRX on duration and/or measure BFD-RSs corresponding to the one or more new candidate beams. The UE 120 may transmit, and the network node 705 may receive, a beam measurement report based at least in part on the beam measurements. In some aspects, the network node 705 may determine a beam to which the UE 120 is to switch based at least in part on the beam measurement report. In some aspects, the network node 705 may transmit, and the UE 120 may receive, an indication of the beam to which the UE 120 is to switch. In this way, a BFR procedure, and particularly a random access procedure of the BFR procedure, may be avoided, thereby conserving processing resources and network resources that otherwise may be expended performing a BFR procedure as well as reducing a latency of communications of the UE 120.

In some aspects, the network node 705 may transmit, and the UE 120 may receive, an indication to activate or to deactivate operations relating to BFD-RS monitoring for DRX, as described herein. In some aspects, the network node 705 may transmit the indication in a MAC-CE or in DCI. In some aspects, the UE 120 may transmit, and the network node 705 may receive, a request to activate or to deactivate operations relating to BFD-RS monitoring for DRX, as described herein. The network node 705 may respond to the request with the indication to activate or to deactivate. In some aspects, the UE may transmit the request in a MAC-CE or in uplink control information. The network node 705 may transmit the indication to activate or to deactivate and/or the UE 120 may transmit the request to activate or to deactivate based at least in part on a QoS requirement of serving traffic, parameters of a DRX configuration of the UE 120 (e.g., a length of a DRX cycle, a length of a DRX on duration, a length of a DRX off duration (e.g., an inactive time of the DRX cycle), or the like), a power constraint associated with the UE 120, a capacity constraint associated with the UE 120, and/or a UE capability constraint associated with the UE 120, among other examples.

The techniques described herein improve a quality of service for the UE 120 by enhancing beam quality maintenance and consistency and/or by improving the diversity of candidate beams for the UE 120. Moreover, the techniques described herein improve beam reliability for the UE 120 and improve the performance of communications of the UE 120 when the UE 120 is operating in a DRX mode.

As indicated above, FIG. 7A is provided as an example. Other examples may differ from what is described with regard to FIG. 7A.

Figure 7B:
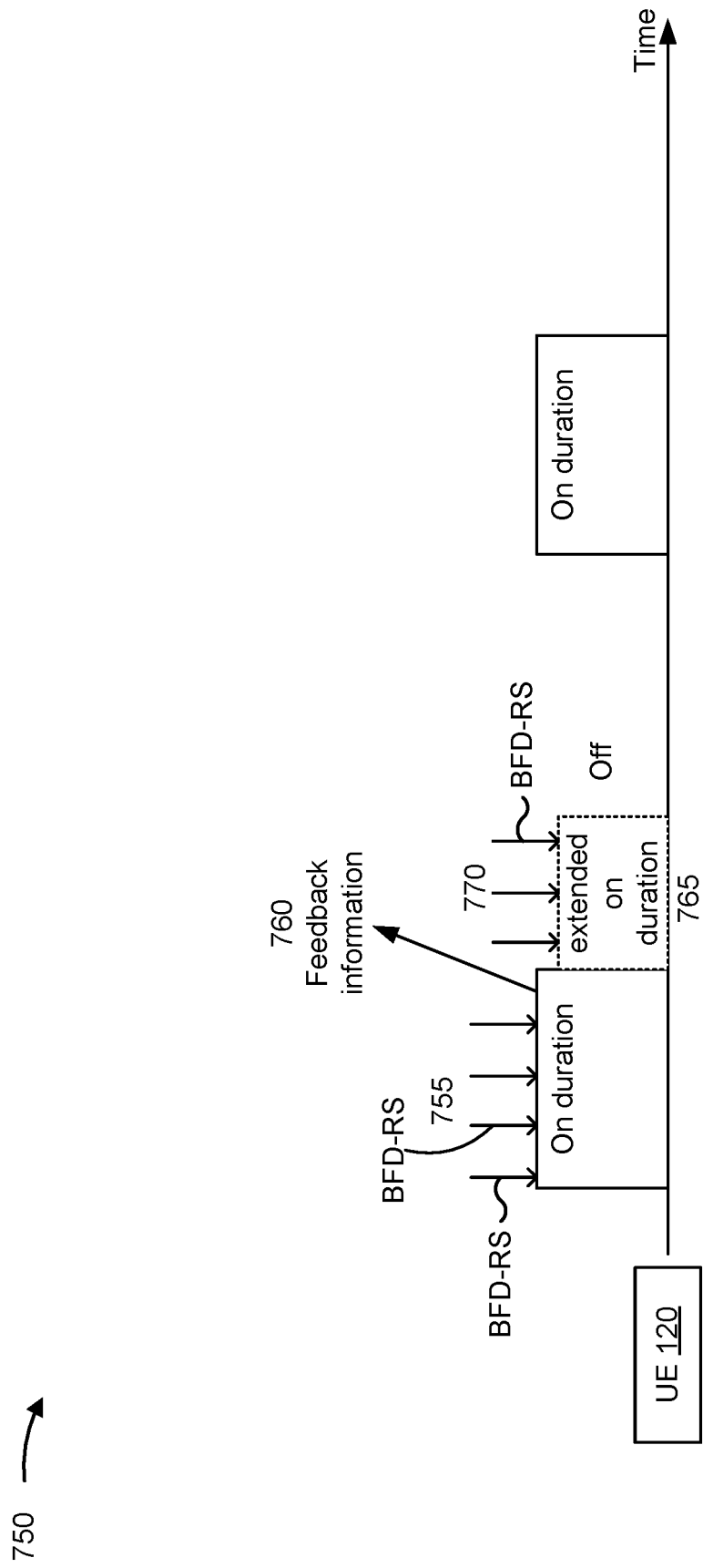

FIG. 7B is a diagram illustrating an example 750 associated with BFD-RS monitoring for DRX, in accordance with the present disclosure.

As shown by reference number 755, the UE 120 may monitor BFD-RSs in a DRX on duration in accordance with a configuration for monitoring BFD-RSs in a DRX on duration, as described herein. As shown by reference number 760, the UE 120 may transmit feedback information at an end of the DRX on duration, as described herein. For example, the feedback information may indicate a request to extend the current DRX on duration and/or indicate a report of a current BFD status of the UE 120.

As shown by reference number 765, based at least in part on signaling from the network node 705, the UE 120 may extend the current DRX on duration, as described herein. As described herein, the network node 705 also may signal resource sets corresponding to new candidate beams for the UE 120 to measure. As shown by reference number 770, the UE 120 may monitor BFD-RSs for the new candidate beams in the extended DRX on duration.

As indicated above, FIG. 7B is provided as an example. Other examples may differ from what is described with regard to FIG. 7B.

FIG. 8 is a diagram illustrating an example process 800 performed, for example, by a UE, in accordance with the present disclosure. Example process 800 is an example where the UE (e.g., UE 120) performs operations associated with BFD-RS monitoring for DRX.

As shown in FIG. 8, in some aspects, process 800 may include receiving, from a network node, configuration information that indicates a configuration for monitoring BFD-RSs in a DRX on duration (block 810). For example, the UE (e.g., using communication manager 140 and/or reception component 1002, depicted in FIG. 10) may receive, from a network node, configuration information that indicates a configuration for monitoring BFD-RSs in a DRX on duration, as described above.

As further shown in FIG. 8, in some aspects, process 800 may include transmitting, to the network node, information that is based at least in part on the BFD-RSs being monitored in the DRX on duration in accordance with the configuration (block 820). For example, the UE (e.g., using communication manager 140 and/or transmission component 1004, depicted in FIG. 10) may transmit, to the network node, information that is based at least in part on the BFD-RSs being monitored in the DRX on duration in accordance with the configuration, as described above.

Process 800 may include additional aspects, such as any single aspect or any combination of aspects described below and/or in connection with one or more other processes described elsewhere herein.

In a first aspect, process 800 includes monitoring the BFD-RSs in the DRX on duration in accordance with the configuration.

In a second aspect, alone or in combination with the first aspect, process 800 includes indicating a beam failure instance based at least in part on a determination that a condition, associated with a BFD-RS of the BFD-RSs, is satisfied.

In a third aspect, alone or in combination with one or more of the first and second aspects, the configuration information is indicated in a radio resource control message.

In a fourth aspect, alone or in combination with one or more of the first through third aspects, the configuration is configured to result in more than one BFD-RS being monitored by the UE in one DRX on duration, and the configuration is configured to enable the UE to indicate a beam failure instance for each BFD-RS being monitored by the UE in the one DRX on duration.

In a fifth aspect, alone or in combination with one or more of the first through fourth aspects, the configuration indicates a time duration in the DRX on duration in which the UE is to monitor the BFD-RSs.

In a sixth aspect, alone or in combination with one or more of the first through fifth aspects, the configuration information further indicates another configuration that indicates that the information is to be transmitted by the UE at an end of the DRX on duration.

In a seventh aspect, alone or in combination with one or more of the first through sixth aspects, the configuration information further indicates an additional configuration that indicates that the information is to be transmitted by the UE responsive to a beam failure instance count satisfying a threshold that is based at least in part on a maximum beam failure instance count for initiating beam failure recovery, or a quantity of consecutive beam failure instances satisfying a threshold.

In an eighth aspect, alone or in combination with one or more of the first through seventh aspects, the information is transmitted in a MAC-CE or in uplink control information.

In a ninth aspect, alone or in combination with one or more of the first through eighth aspects, the information indicates at least one of a request to extend the DRX on duration, or a report of a beam failure detection status.

In a tenth aspect, alone or in combination with one or more of the first through ninth aspects, process 800 includes receiving (e.g., using a transceiver) an indication that indicates at least one of an extension of the DRX on duration, or a resource set corresponding to one or more new candidate beams to be measured by the UE.

In an eleventh aspect, alone or in combination with one or more of the first through tenth aspects, the indication is in a MAC-CE or in downlink control information.

In a twelfth aspect, alone or in combination with one or more of the first through eleventh aspects, process 800 includes receiving (e.g., using a transceiver) beam management information indicating at least one of beaming information relating to one or more new candidate beams, BFD-RS monitoring resources for the one or more new candidate beams, a transmission frequency of BFD-RSs for the one or more new candidate beams, or beaming failure detection parameters for the one or more new candidate beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
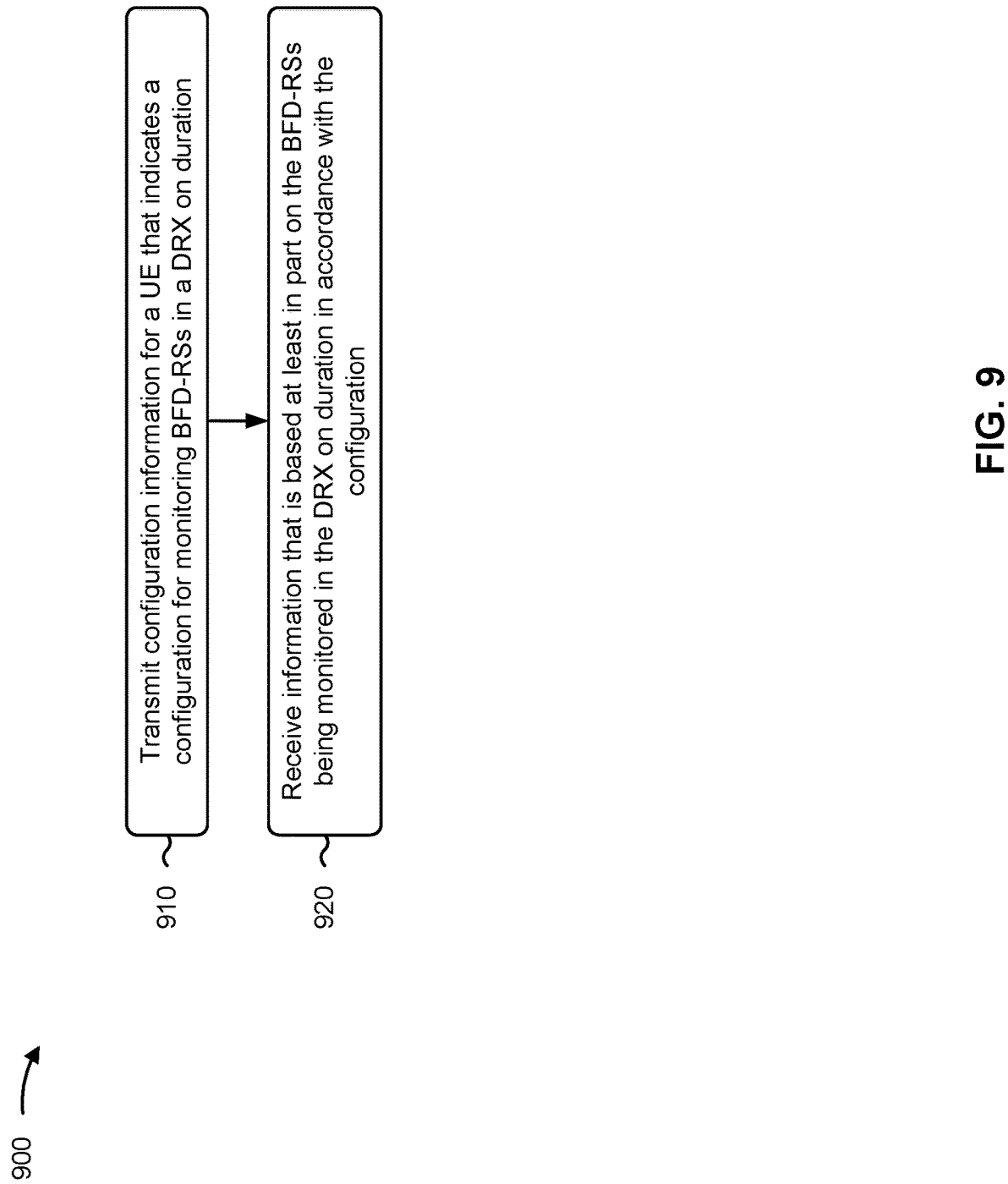

FIG. 9 is a diagram illustrating an example process 900 performed, for example, by a network node, in accordance with the present disclosure. Example process 900 is an example where the network node (e.g., base station 110, CU 310, DU 330, RU 340, network node 705, or the like) performs operations associated with BFD-RS monitoring for DRX.

As shown in FIG. 9, in some aspects, process 900 may include transmitting configuration information for a UE that indicates a configuration for monitoring BFD-RSs in a DRX on duration (block 910). For example, the network node (e.g., using communication manager 1108 and/or transmission component 1104, depicted in FIG. 11) may transmit configuration information for a UE that indicates a configuration for monitoring BFD-RSs in a DRX on duration, as described above.

As further shown in FIG. 9, in some aspects, process 900 may include receiving information that is based at least in part on the BFD-RSs being monitored in the DRX on duration in accordance with the configuration (block 920). For example, the network node (e.g., using communication manager 1108 and/or reception component 1102, depicted in FIG. 11) may receive information that is based at least in part on the BFD-RSs being monitored in the DRX on duration in accordance with the configuration, as described above.

Process 900 may include additional aspects, such as any single aspect or any combination of aspects described below and/or in connection with one or more other processes described elsewhere herein.

In a first aspect, the configuration information is indicated in a radio resource control message.

In a second aspect, alone or in combination with the first aspect, the configuration is configured to result in more than one BFD-RS being monitored by the UE in one DRX on duration, and the configuration is configured to enable the UE to indicate a beam failure instance for each BFD-RS being monitored by the UE in the one DRX on duration.

In a third aspect, alone or in combination with one or more of the first and second aspects, the configuration indicates a time duration in the DRX on duration in which the UE is to monitor the BFD-RSs.

In a fourth aspect, alone or in combination with one or more of the first through third aspects, the configuration information further indicates another configuration that indicates that the information is to be transmitted by the UE at an end of the DRX on duration.

In a fifth aspect, alone or in combination with one or more of the first through fourth aspects, the configuration information further indicates an additional configuration that indicates that the information is to be transmitted by the UE responsive to a beam failure instance count satisfying a threshold that is based at least in part on a maximum beam failure instance count for initiating beam failure recovery, or a quantity of consecutive beam failure instances satisfying a threshold.

In a sixth aspect, alone or in combination with one or more of the first through fifth aspects, the information is received in a MAC-CE or in uplink control information.

In a seventh aspect, alone or in combination with one or more of the first through sixth aspects, the information indicates at least one of a request to extend the DRX on duration, or a report of a beam failure detection status.

In an eighth aspect, alone or in combination with one or more of the first through seventh aspects, process 900 includes transmitting (e.g., using a transceiver) an indication that indicates at least one of an extension of the DRX on duration, or a resource set corresponding to one or more new candidate beams to be measured by the UE.

In a ninth aspect, alone or in combination with one or more of the first through eighth aspects, the indication is in a MAC-CE or in downlink control information.

In a tenth aspect, alone or in combination with one or more of the first through ninth aspects, process 900 includes transmitting (e.g., using a transceiver) beam management information indicating at least one of beaming information relating to one or more new candidate beams, BFD-RS monitoring resources for the one or more new candidate beams, a transmission frequency of BFD-RSs for the one or more new candidate beams, or beaming failure detection parameters for the one or more new candidate beams.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
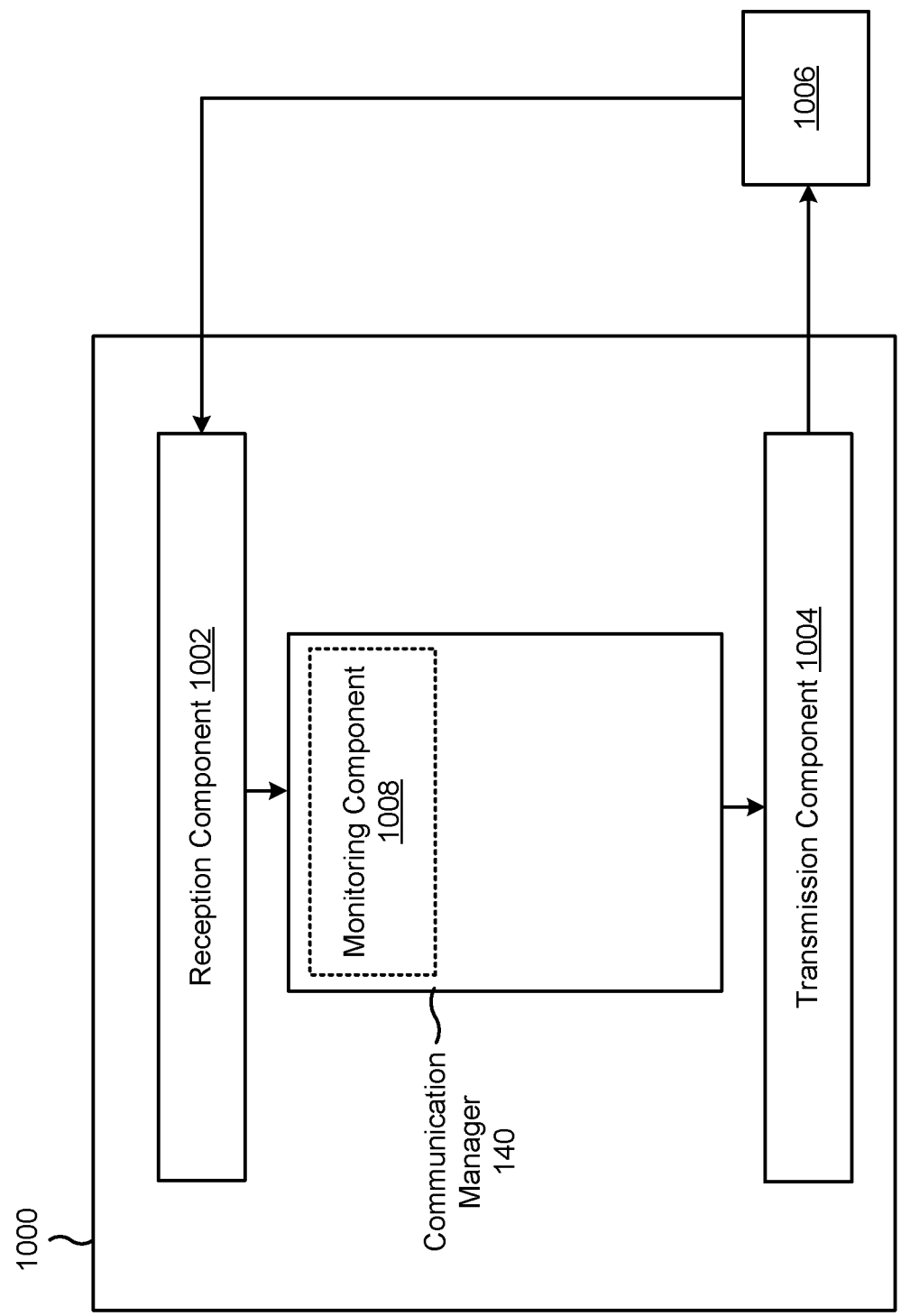
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a monitoring component 1008, among other examples.

In some aspects, the apparatus 1000 may be configured to perform one or more operations described herein in connection with FIGS. 7A-7B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network node, configuration information that indicates a configuration for monitoring BFD-RSs in a DRX on duration. The transmission component 1004 may transmit, to the network node, information that is based at least in part on the BFD-RSs being monitored in the DRX on duration in accordance with the configuration.

The monitoring component 1008 may monitor the BFD-RSs in the DRX on duration in accordance with the configuration. The monitoring component 1008 may indicate a beam failure instance based at least in part on a determination that a condition, associated with a BFD-RS of the BFD-RSs, is satisfied.

The reception component 1002 may receive an indication that indicates at least one of an extension of the DRX on duration, or a resource set corresponding to one or more new candidate beams to be measured by the UE.

The reception component 1002 may receive beam management information indicating at least one of beam information relating to one or more new candidate beams, BFD-RS monitoring resources for the one or more new candidate beams, a transmission frequency of BFD-RSs for the one or more new candidate beams, or beam failure detection parameters for the one or more new candidate beams.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
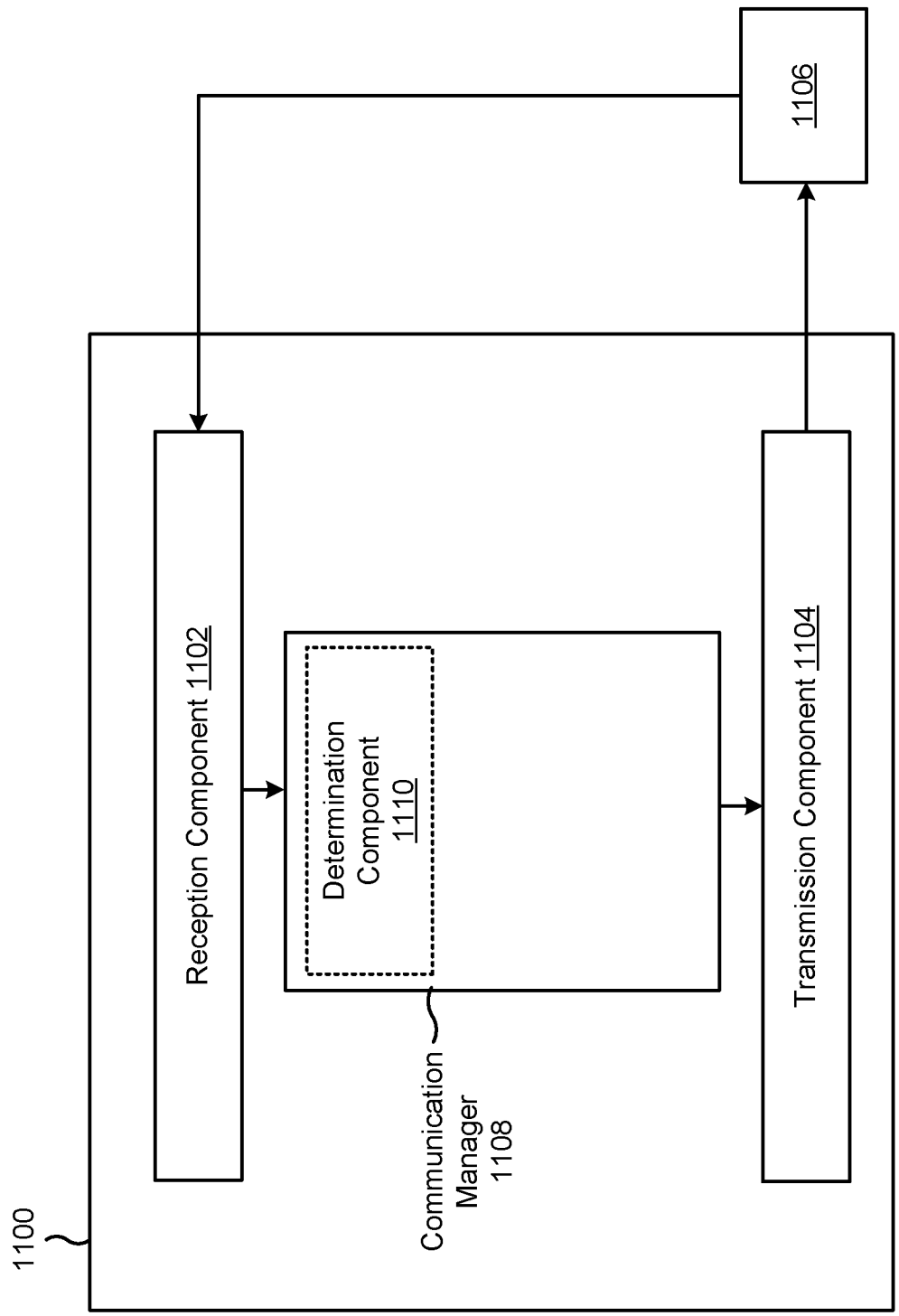

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108. The communication manager 1108 may include, may be included in, or may be similar to, the communication manager 150. The communication manager 1108 may include a determination component 1110, among other examples.

In some aspects, the apparatus 1100 may be configured to perform one or more operations described herein in connection with FIGS. 7A-7B. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit configuration information for a UE that indicates a configuration for monitoring BFD-RSs in a DRX on duration. The reception component 1102 may receive information that is based at least in part on the BFD-RSs being monitored in the DRX on duration in accordance with the configuration.

The transmission component 1104 may transmit an indication that indicates at least one of an extension of the DRX on duration, or a resource set corresponding to one or more new candidate beams to be measured by the UE.

The transmission component 1104 may transmit beam management information indicating at least one of beam information relating to one or more new candidate beams, BFD-RS monitoring resources for the one or more new candidate beams, a transmission frequency of BFD-RSs for the one or more new candidate beams, or beam failure detection parameters for the one or more new candidate beams.

The determination component 1110 may determine whether to extend the DRX on duration, may determine the one or more new candidate beams, or the like.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network node, configuration information that indicates a configuration for monitoring beam failure detection reference signals (BFD-RSs) in a discontinuous reception (DRX) on duration; and transmitting, to the network node, information that is based at least in part on the BFD-RSs being monitored in the DRX on duration in accordance with the configuration.

Aspect 2: The method of Aspect 1, further comprising: monitoring the BFD-RSs in the DRX on duration in accordance with the configuration.

Aspect 3: The method of Aspect 2, further comprising: indicating a beam failure instance based at least in part on a determination that a condition, associated with a BFD-RS of the BFD-RSs, is satisfied.

Aspect 4: The method of any of Aspects 1-3, wherein the configuration information is indicated in a radio resource control message.

Aspect 5: The method of any of Aspects 1-4, wherein the configuration is configured to result in more than one BFD-RS being monitored by the UE in one DRX on duration, and wherein the configuration is configured to enable the UE to indicate a beam failure instance for each BFD-RS being monitored by the UE in the one DRX on duration.

Aspect 6: The method of any of Aspects 1-5, wherein the configuration indicates a time duration in the DRX on duration in which the UE is to monitor the BFD-RSs.

Aspect 7: The method of any of Aspects 1-6, wherein the configuration information further indicates another configuration that indicates that the information is to be transmitted by the UE at an end of the DRX on duration.

Aspect 8: The method of Aspect 7, wherein the configuration information further indicates an additional configuration that indicates that the information is to be transmitted by the UE responsive to: a beam failure instance count satisfying a threshold that is based at least in part on a maximum beam failure instance count for initiating beam failure recovery, or a quantity of consecutive beam failure instances satisfying a threshold.

Aspect 9: The method of any of Aspects 1-8, wherein the information is transmitted in a medium access control control element (MAC-CE) or in uplink control information.

Aspect 10: The method of any of Aspects 1-9, wherein the information indicates at least one of: a request to extend the DRX on duration, or a report of a beam failure detection status.

Aspect 11: The method of any of Aspects 1-10, further comprising: receiving an indication that indicates at least one of: an extension of the DRX on duration, or a resource set corresponding to one or more new candidate beams to be measured by the UE.

Aspect 12: The method of Aspect 11, wherein the indication is in a medium access control control element (MAC-CE) or in downlink control information.

Aspect 13: The method of any of Aspects 1-12, further comprising: receiving beam management information indicating at least one of: beam information relating to one or more new candidate beams, BFD-RS monitoring resources for the one or more new candidate beams, a transmission frequency of BFD-RSs for the one or more new candidate beams, or beam failure detection parameters for the one or more new candidate beams.

Aspect 14: A method of wireless communication performed by a network node, comprising: transmitting configuration information for a user equipment (UE) that indicates a configuration for monitoring beam failure detection reference signals (BFD-RSs) in a discontinuous reception (DRX) on duration; and receiving information that is based at least in part on the BFD-RSs being monitored in the DRX on duration in accordance with the configuration.

Aspect 15: The method of Aspect 14, wherein the configuration information is indicated in a radio resource control message.

Aspect 16: The method of any of Aspects 14-15, wherein the configuration is configured to result in more than one BFD-RS being monitored by the UE in one DRX on duration, and wherein the configuration is configured to enable the UE to indicate a beam failure instance for each BFD-RS being monitored by the UE in the one DRX on duration.

Aspect 17: The method of any of Aspects 14-16, wherein the configuration indicates a time duration in the DRX on duration in which the UE is to monitor the BFD-RSs.

Aspect 18: The method of any of Aspects 14-17, wherein the configuration information further indicates another configuration that indicates that the information is to be transmitted by the UE at an end of the DRX on duration.

Aspect 19: The method of Aspect 18, wherein the configuration information further indicates an additional configuration that indicates that the information is to be transmitted by the UE responsive to: a beam failure instance count satisfying a threshold that is based at least in part on a maximum beam failure instance count for initiating beam failure recovery, or a quantity of consecutive beam failure instances satisfying a threshold.

Aspect 20: The method of any of Aspects 14-19, wherein the information is received in a medium access control control element (MAC-CE) or in uplink control information.

Aspect 21: The method of any of Aspects 14-20, wherein the information indicates at least one of: a request to extend the DRX on duration, or a report of a beam failure detection status.

Aspect 22: The method of any of Aspects 14-21, further comprising: transmitting an indication that indicates at least one of: an extension of the DRX on duration, or a resource set corresponding to one or more new candidate beams to be measured by the UE.

Aspect 23: The method of Aspect 22, wherein the indication is in a medium access control control element (MAC-CE) or in downlink control information.

Aspect 24: The method of any of Aspects 14-23, further comprising: transmitting beam management information indicating at least one of: beam information relating to one or more new candidate beams, BFD-RS monitoring resources for the one or more new candidate beams, a transmission frequency of BFD-RSs for the one or more new candidate beams, or beam failure detection parameters for the one or more new candidate beams.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-13.

Aspect 27: An apparatus for wireless communication, comprising at least one means for performing the method of one or more of Aspects 1-13.

Aspect 28: A non-transitory computer-readable medium storing code for wireless communication, the code comprising instructions executable by a processor to perform the method of one or more of Aspects 1-13.

Aspect 29: A non-transitory computer-readable medium storing a set of instructions for wireless communication, the set of instructions comprising one or more instructions that, when executed by one or more processors of a device, cause the device to perform the method of one or more of Aspects 1-13.

Aspect 30: An apparatus for wireless communication at a device, comprising a processor; memory coupled with the processor; and instructions stored in the memory and executable by the processor to cause the apparatus to perform the method of one or more of Aspects 14-24.

Aspect 31: A device for wireless communication, comprising a memory and one or more processors coupled to the memory, the one or more processors configured to perform the method of one or more of Aspects 14-24.

Aspect 32: An apparatus for wireless communication, comprising at least one means for performing the method of one or more of Aspects 14-24.

Aspect 33: A non-transitory computer-readable medium storing code for wireless communication, the code comprising instructions executable by a processor to perform the method of one or more of Aspects 14-24.

Aspect 34: A non-transitory computer-readable medium storing a set of instructions for wireless communication, the set of instructions comprising one or more instructions that, when executed by one or more processors of a device, cause the device to perform the method of one or more of Aspects 14-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled with the memory and configured to cause the UE to:
        receive, from a network node, configuration information that indicates a configuration for monitoring a plurality of beam failure detection reference signals (BFD-RSs) within a discontinuous reception (DRX) on duration; and
        transmit, to the network node and at an end of the DRX on duration, information that is based at least in part on a plurality of beam failure instance (BFI) indications corresponding to the plurality of BFD-RSs being monitored within the DRX on duration in accordance with the configuration.

2. The UE of claim 1, wherein the one or more processors are configured to cause the UE to:
    monitor the plurality of BFD-RSs within the DRX on duration in accordance with the configuration.

3. The UE of claim 2, wherein the one or more processors are configured to cause the UE to:
    indicate a BFI based at least in part on a determination that a condition, associated with a BFD-RS of the plurality of BFD-RSs, is satisfied.

4. The UE of claim 1, wherein the configuration information is indicated in a radio resource control message.

5. The UE of claim 1, wherein the configuration is configured to result in more than one BFD-RS being monitored by the UE in one DRX on duration, and
    wherein the configuration is configured to enable the UE to indicate a BFI for each BFD-RS being monitored by the UE in the one DRX on duration.

6. The UE of claim 1, wherein the configuration indicates a time duration in the DRX on duration in which the UE is to monitor the plurality of BFD-RSs.

7. The UE of claim 1, wherein the configuration for monitoring the plurality of BFD-RSs within the DRX on duration corresponds to a first configuration, and wherein the configuration information indicates a second configuration that indicates that the information is to be transmitted by the UE at the end of the DRX on duration.

8. The UE of claim 7, wherein the configuration information indicates a third configuration that indicates that the information is to be transmitted by the UE responsive to:
    a BFI count satisfying a threshold that is based at least in part on a maximum BFI count for initiating beam failure recovery, or
    a quantity of consecutive beam failure instances (BFIs) satisfying a threshold.

9. The UE of claim 1, wherein the information is transmitted in a medium access control control element (MAC-CE) or in uplink control information.

10. The UE of claim 1, wherein the information indicates at least one of:
    a request to extend the DRX on duration, or
    a report of a beam failure detection status.

11. The UE of claim 1, further comprising a transceiver, wherein the one or more processors are configured to cause the transceiver to:
    receive an indication that indicates at least one of:
        an extension of the DRX on duration, or
        a resource set corresponding to one or more new candidate beams to be measured by the UE.

12. The UE of claim 11, wherein the indication is in a medium access control control element (MAC-CE) or in downlink control information.

13. The UE of claim 1, further comprising a transceiver, wherein the one or more processors are configured to cause the transceiver to:
    receive beam management information indicating at least one of:
        beam information relating to one or more new candidate beams,
        BFD-RS monitoring resources for the one or more new candidate beams,
        a transmission frequency of BFD-RSs for the one or more new candidate beams, or
        beam failure detection parameters for the one or more new candidate beams.

14. A network node for wireless communication, comprising:
    a memory; and
    one or more processors coupled with the memory and configured to cause the network node to:
        transmit configuration information for a user equipment (UE) that indicates a first configuration for monitoring a plurality of beam failure detection reference signals (BFD-RSs) within a discontinuous reception (DRX) on duration, wherein the configuration information indicates a second configuration that indicates that feedback information for the plurality of BFD-RSs is to be transmitted by the UE at an end of the DRX on duration; and
        receive the feedback information that is based at least in part on the plurality of BFD-RSs in accordance with the configuration information.

15. The network node of claim 14, wherein the configuration information is indicated in a radio resource control message.

16. The network node of claim 14, wherein the first configuration is configured to result in more than one BFD-RS being monitored by the UE in one DRX on duration, and
    wherein the first configuration is configured to enable the UE to indicate a beam failure instance for each BFD-RS being monitored by the UE in the one DRX on duration.

17. The network node of claim 14, wherein the first configuration indicates a time duration in the DRX on duration in which the UE is to monitor the plurality of BFD-RSs.

18. The network node of claim 14, wherein the configuration information indicates a third configuration that indicates that the feedback information is to be transmitted by the UE responsive to:
 a beam failure instance count satisfying a threshold that is based at least in part on a maximum beam failure instance count for initiating beam failure recovery, or
 a quantity of consecutive beam failure instances satisfying a threshold.

19. The network node of claim 14, wherein the feedback information is received in a medium access control control element (MAC-CE) or in uplink control information.

20. The network node of claim 14, wherein the feedback information indicates at least one of:
 a request to extend the DRX on duration, or
 a report of a beam failure detection status.

21. The network node of claim 14, further comprising a transceiver,
 wherein the one or more processors are configured to cause the transceiver to:
  transmit an indication that indicates at least one of:
   an extension of the DRX on duration, or
   a resource set corresponding to one or more new candidate beams to be measured by the UE.

22. The network node of claim 21, wherein the indication is in a medium access control control element (MAC-CE) or in downlink control information.

23. The network node of claim 14, further comprising a transceiver,
 wherein the one or more processors are configured to cause the transceiver to:
  transmit beam management information indicating at least one of:
   beam information relating to one or more new candidate beams,
   BFD-RS monitoring resources for the one or more new candidate beams,
   a transmission frequency of BFD-RSs for the one or more new candidate beams, or
   beam failure detection parameters for the one or more new candidate beams.

24. A method of wireless communication performed by a user equipment (UE), comprising:
 receiving, from a network node, configuration information that indicates a configuration for monitoring beam failure detection reference signals (BFD-RSs) in a discontinuous reception (DRX) on duration; and
 transmitting, to the network node and at an end of the DRX on duration, information that is based at least in part on a plurality of beam failure instance (BFI) indications corresponding to the plurality of BFD-RSs being monitored within the DRX on duration in accordance with the configuration.

25. The method of claim 24, wherein the information indicates at least one of:
 a request to extend the DRX on duration, or
 a report of a beam failure detection status.

26. The method of claim 24, further comprising:
 receiving an indication that indicates at least one of:
  an extension of the DRX on duration, or
  a resource set corresponding to one or more new candidate beams to be measured by the UE.

27. The method of claim 24, wherein the information indicates a quantity of consecutive beam failure instances (BFIs) for the plurality of BFD-RSs being monitored within the DRX on duration.

28. A method of wireless communication performed by a network node, comprising:
 transmitting configuration information for a user equipment (UE) that indicates a first configuration for monitoring a plurality of beam failure detection reference signals (BFD-RSs) within a discontinuous reception (DRX) on duration, wherein the configuration information indicates a second configuration that indicates that feedback information for the plurality of BFD-RSs is to be transmitted by the UE at an end of the DRX on duration; and
 receiving the feedback information that is based at least in part on the plurality of BFD-RSs in accordance with the configuration information.

29. The method of claim 28, wherein the feedback information indicates at least one of:
 a request to extend the DRX on duration, or
 a report of a beam failure detection status.

30. The method of claim 28, further comprising:
 transmitting an indication that indicates at least one of:
  an extension of the DRX on duration, or
  a resource set corresponding to one or more new candidate beams to be measured by the UE.

\* \* \* \* \*